Aug. 9, 1932.  Q. G. NOBLITT ET AL  1,870,378
MOUNTING FOR AUTOMOBILE HEATERS
Original Filed March 28, 1930
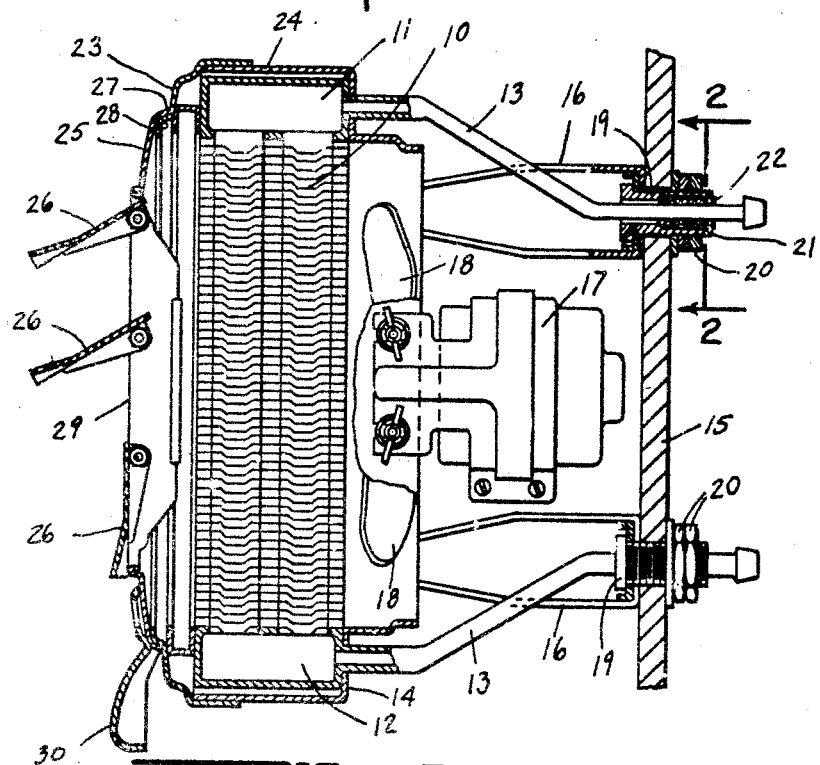
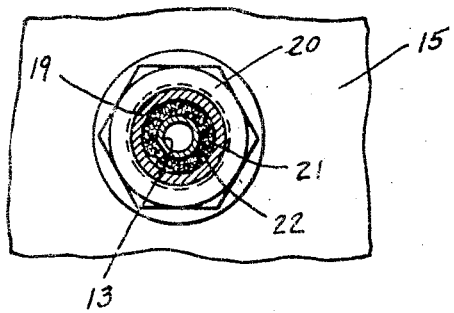
INVENTORS
QUINTIN G. NOBLITT
EARL C. BOOTH.
BY
ATTORNEYS.

Patented Aug. 9, 1932

1,870,378

UNITED STATES PATENT OFFICE

QUINTIN G. NOBLITT AND EARL C. BOOTH, OF INDIANAPOLIS, INDIANA, ASSIGNORS TO NOBLITT-SPARKS INDUSTRIES, INC., OF INDIANAPOLIS, INDIANA, A CORPORATION

MOUNTING FOR AUTOMOBILE HEATERS

Original application filed March 28, 1930, Serial No. 439,717. Divided and this application filed October 2, 1931. Serial No. 566,570.

This invention relates to a heating unit particularly for use in connection with automobiles wherein a stream of air to be heated is directed over a heating element. The said heating element is preferably of the hot water type associated with the cooling system of the automobile, reference being had to our co-pending application, Serial No. 439,717, filed March 28, 1930, of which this is a division.

The particular feature of the present invention resides in the support for the heater on the dashboard of an automobile or other vehicle. It is highly desirable in this connection that a simple but sturdy support be provided which will permit of ready installation and mounting, while, at the same time, withstanding almost constant vibration and jarring. It is, therefore, highly desirable that the water conduits to and from the heating element and which must pass through the dashboard should be associated with and incorporated in the mounting to reduce the number of openings through the dashboard.

To this end, there is provided a pair of tubular supporting members which are connected with the heater to be supported, said tubular members being adapted to extend through suitable openings in the dashboard and be rigidly clamped thereto. Thus a sturdy support of a simple character is provided for the heater. Said tubular members permit the water circulating conduits to pass therethrough and, in order that said conduits may be protected from vibration and jarring as well as loss of heat through convection, they are held in spaced relation to said members and, in addition thereto, may be surrounded with a heat insulating and yielding packing material.

The full nature of the invention will be more fully understood from the accompanying drawing and the following description and claims:

Figure 1 is a central vertical section through the heater and the supporting members thereof. Figure 2 is an enlarged section taken on the line 2—2 of Figure 1.

The heater comprises, in the particular form shown herein, a radiator core 10 supported in an upper header 11 and a lower header 12 connected to the water cooling system of an internal combustion engine mounted in an automobile through the water conduits 13. The radiator core and headers are supported in a suitable casing 14 which is mounted upon the dashboard 15 of an automobile by the brackets 16. Supported on the casing at the rear of the heater there is an electric motor 17 operated from the electrical system of an automobile and adapted to drive the fan blades 18 for forcing a current of air through the radiator core from the rear to the front thereof.

The water conduit tubes 13 extend through the tubular supporting members 19 extending through the dashboard 15 and secured thereto by the nuts 20. Said members are provided with an inner recess 21 in which is housed a resilient heat insulating packing sleeve 22. Said packing sleeve, which is preferably made of rubber or any other suitable composition, is adapted to support the tube free from the inner surface of the supporting member so as to be in spaced relation thereto. Thus, the tube is protected from wear and vibration while the convection of heat therefrom is minimized by insulation and spacing.

Inasmuch as it is desirable to control the direction of flow of the heated air forced through the radiator, there is mounted upon the shield 23 supported upon the front of the radiator casing 24, a deflector 25 having a plurality of pivotally mounted shutters 26 mounted therein. The peripheral edge of the reflector is circular and is provided with the flange 27 extending about the corresponding circular flange 28 defining the opening in the shield 23. The deflector 25 is formed with a rectangular opening having side walls 29 to which the shutters are pivoted. By means of the shutters, the opening in the face of the radiator may be entirely closed, or partially opened as illustrated in the drawing through the medium of said shutters. Furthermore, the shutters may be utilized to deflect the air at an angle to the axis of the fan and face of the heater.

Inasmuch as it is desirable to deflect the hot air through the medium of the shutters to one side or the other, up or down, the deflector 25 is mounted to rotate upon the shield 23, about the circular flange 28 thereof. For that purpose, a handle 30 is provided for permitting the operator to grasp the said handle and rotate the deflector to any desired position.

The invention claimed is:

1. The combination with an automobile heater having a radiator core adapted to be mounted upon the dashboard of an automobile, of means for supporting said heater upon said dashboard comprising a plurality of tubular supporting members extending through suitable openings in said dashboard and secured to said heater, means for rigidly clamping said tubular members to said dashboard, and inlet and outlet conduits communicating with the radiator core of said heater adapted to extend through said tubular members in spaced relation thereto, whereby transmission of heat and vibration between said conduits and members may be minimized.

2. The combination with an automobile heater having a radiator core adapted to be mounted upon the dashboard of an automobile, of means for supporting said heater upon said dashboard comprising a plurality of tubular supporting members extending through suitable openings in said dashboard and secured to said heater, means for rigidly clamping said tubular members to said dashboard, inlet and outlet conduits communicating with the radiator core of said heater adapted to extend through said tubular members in spaced relation thereto, and a packing material interposed between one of said conduits and its respective tubular member for yieldingly supporting the same in spaced relation thereto and resisting heat transmission therebetween, whereby transmission of heat and vibration between said conduits and members may be minimized.

3. The combination with an automobile heater having a radiator core adapted to be mounted upon the dashboard of an automobile and having conduits connected thereto for conducting water from the cooling system of the automobile through said radiator, of means for supporting said heater upon said dashboard comprising a plurality of tubular supporting members adapted to extend through said dashboard through which said conduits are adapted to extend in spaced relation thereto, means for rigidly clamping said members to said dashboard, and a frame structure mounted on said tubular member upon which said heater is mounted, whereby said heater will be supported by said members independently of said conduits and said conduits will be protected from vibration and loss of heat through said tubular members.

4. The combination with an automobile heater having a radiator core adapted to be mounted upon the dashboard of an automobile and having conduits connected thereto for conducting water from the cooling system of the automobile through said radiator, of means for supporting said heater upon said dashboard comprising a plurality of tubular supporting members adapted to extend through said dashboard through which said conduits are adapted to extend in spaced relation thereto, means for rigidly clamping said members to said dashboard, a frame structure mounted on said tubular members upon which said heater is mounted, and an insulating material surrounding said conduits within their tubular members, whereby said heater will be supported by said members independently of said conduits and said conduits will be protected from vibration and loss of heat through said tubular members.

5. The combination with an automobile heater having a radiator core adapted to be mounted upon the dashboard of an automobile and having conduits connected thereto for conducting water from the cooling system of the automobile through said radiator, of means for supporting said radiator core upon said dashboard and permitting the passage of said conduits therethrough comprising a plurality of tubular supporting members adapted to extend through said dashboard and be rigidly clamped thereto through which said conduits are adapted to extend, brackets connected with said radiator core and secured to said members, the inner diameter of said tubular members being greater than the outer diameter of said conduits, and means for yieldingly supporting said conduits in said members in spaced relation thereto.

6. The combination with an automobile heater having a radiator core adapted to be mounted upon the dashboard of the automobile and having conduits connected thereto for conducting water from the cooling system of the automobile through the said radiator, of means for supporting the said heater upon the said dashboard, said means including a tubular member extending through said dashboard, means for clamping said member to the dashboard, and a frame structure supported by said tubular member on which the said radiator core is mounted, one of said conduits extending through said tubular member.

In witness whereof, we have hereunto affixed our signatures.

QUINTIN G. NOBLITT.
EARL C. BOOTH.